(No Model.)
W. H. ELKINS.
REGULATOR.
No. 502,285.  Patented Aug. 1, 1893.
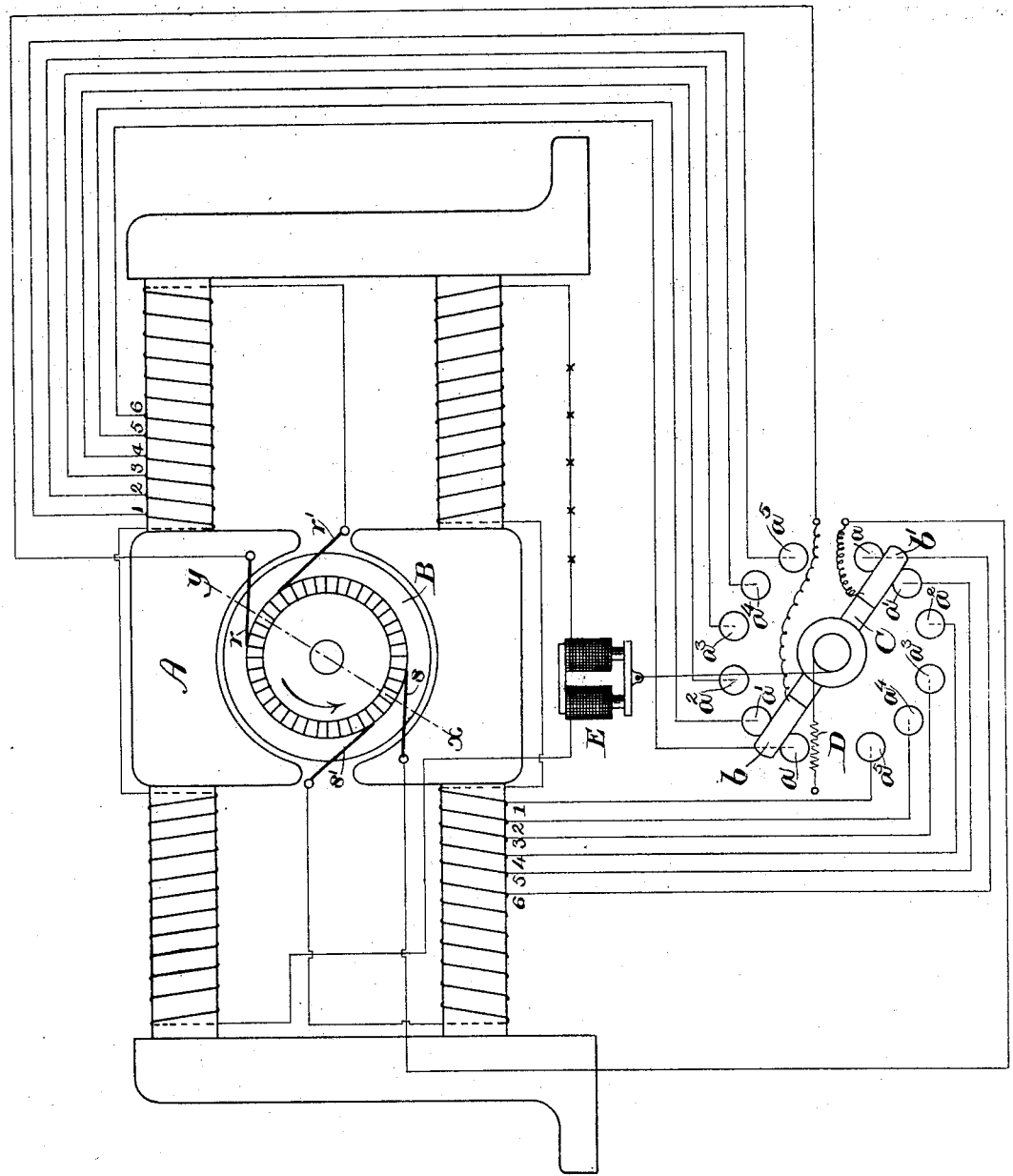
WITNESSES
A. C. Orne
N. F. Hayes
INVENTOR
William H. Elkins
by Bentley & Blodgett
Attys.

UNITED STATES PATENT OFFICE.

WILLIAM H. ELKINS, OF CAMBRIDGE, MASSACHUSETTS, ASSIGNOR TO THE GENERAL ELECTRIC COMPANY, OF NEW YORK.

REGULATOR.

SPECIFICATION forming part of Letters Patent No. 502,285, dated August 1, 1893.

Application filed January 3, 1893. Serial No. 457,023. (No model.)

*To all whom it may concern:*

Be it known that I, WILLIAM H. ELKINS, a citizen of the United States, residing at Cambridge, in the county of Middlesex and State of Massachusetts, have invented certain new and useful Improvements in Regulators, of which the following is a specification.

My invention relates to means for regulating dynamo electric machines and especially series machines, such as are commonly used on arc light circuits. As is well known when translating devices are cut out on a series circuit, the effective voltage of the machine should be correspondingly reduced, and this means I accomplish mainly by varying the strength of the field so as to preserve the proper proportion between it and the voltage required to run properly such devices as may be in circuit at any given time. I accomplish this end by double pairs of brushes, the brushes of each pair being set some distance apart and at full load on opposite sides of and at approximately equal distances from, the neutral line or line of maximum potential. These brushes are so connected with the field winding of the machine that whereas the current passing from one brush will flow through the entire field winding, the current coming from the other brush on the contrary is made to pass through such portion only of the field winding as will result in giving the necessary strength of field to secure the desired voltage. In order that this may be accomplished the whole or any sufficient part of the field winding is, as it were, divided into sections by being connected to suitably arranged contacts, and an automatic switch or controller is so arranged that when the potential of the main circuit becomes too great the controller is thrown so that more or less of the field sections are shunted.

In the accompanying drawing the figure is a diagram showing the invention.

A is a dynamo of the Siemens or consequent pole type. The armature B is supposed to revolve from right to left in the direction indicated by the arrow, and the neutral line or line of maximum potential is supposed to occupy substantially the position of the dotted lines $xy$. The field winding is, in the main, in series with the armature, but at different points such as 1, 2, 3, 4, &c. Connections are led off to series of contacts $a$, $a'$, $a^2$, &c., over which sweeps the movable switch arm C of the circuit controller. This arm has two contact portions $b$, $b'$ which are insulated from one another, and are connected respectively to corresponding brushes forming opposite poles of the dynamo. These two contact portions sweep over the rows of contacts $a$, $a'$, &c., which, as is sufficiently clear from the drawing, are so arranged that equal and corresponding sections on opposite cores of the field magnets are shunted so as to interfere as little as possible with the uniformity of the field. A spring D or other retractor, tends to throw the arm to the left upon the last contact, when the field strength is at a maximum, and it is moved in the opposite direction by a device responsive to changes of current in the main circuit of the machine. Such a device is indicated at E as consisting of a magnet in the main circuit whose armature is connected with arm C. The mechanism recommended for actual practice consists of a motor magnet connected to the brushes whose action is controlled by a controlling magnet coupled up in the main circuit, a well known form of mechanism largely employed in current regulators for dynamo electric machines of the brush shifting type.

The commutator brushes are four in number grouped in two pairs which are marked $r$, $r'$ and $s$, $s'$ respectively. Their full load position is substantially that shown in the drawing on opposite sides of, and at approximately equal distances from, the neutral line or line of maximum potential, which is represented by $xy$. The brush $r$ is connected to the contact portion $b$ of the arm C, and the current flowing out from this brush will, as is apparent, be shunted around more or less of the field winding according to the positions assumed by the switch arm under the action of the responsive device under different conditions of load. The brush $r'$ is connected directly to one terminal of the field winding so that the current from it passes through the entire field. In the drawing the connections are arranged so that the current from the brush $r$ is always shunted through a portion of the field, but this is illustrative merely, and in practice the two brushes when the switch arm engages contacts $a$, may both be connected with the terminal of the field so that practically none of the winding would be shunted. The connections for brushes $s$, $s'$ correspond in all respects to those just described for $r, r'$, brush $s'$ being joined directly to the second field terminal, and brush $s$ to the circuit controller.

The operation of the invention is as follows: At full load the brushes of each pair, for example, $r, r'$, will be at points of approximately equal potential, though their actual potential will be less than that at the segments nearer the neutral line. If now part of the load be cut out of circuit, the field strength will be correspondingly cut down from a variety of causes, principally because the increase of current in the main circuit incident to lessening the load will have automatically shifted the switch arm C toward the right so shunting the current from brush $r$ around a larger portion of the field winding. The distribution of the current between the two brushes also is modified because in the conditions assumed the neutral line will tend to shift nearer the brush $r$ reducing the potential at the segment engaged by brush $r'$ so that the current passing from this brush and through the entire field is also somewhat lessened. The exact locations at which the divisions of the field winding should be made will of course vary in machines of different types and of different proportions, but in each case they should be so arranged that the increment or reduction in the field strength secured in the manner described, is kept proportional to the changes of load so that in each case the field strength will be just sufficient to give the normal current in the main circuit.

What I claim as new, and desire to secure by Letters Patent, is—

1. The combination, in a regulator for dynamo electric machines, of means for dividing the field exciting current into two portions, one such portion passing through the entire field magnet winding, means for shunting the other portion around more or less of the field-magnet winding, and a device responsive to changes in the main or generated current and arranged to adjust the length of the shunted field-magnet winding so as to preserve a resultant field strength adapted to maintain a practically uniform current in the main circuit under varying loads.

2. The combination in a regulator for dynamo electric machines, of pairs of brushes forming the poles of the machine, one set of such brushes being connected to the terminals of the field winding, and a circuit controller in the circuit of the other set of such brushes which circuit controller shunts more or less of the field according to its adjustment, and a device responsive to changes in the main or generated current for actuating such circuit controller so as to preserve the effective voltage of the machine such as will maintain a practically constant current in the main circuit under varying loads.

3. The combination in a regulator for dynamo electric machines, of pairs of brushes $r$, $r'$ and $s$, $s'$, set normally at full load on opposite sides of the line of maximum potential, with circuit connections joining brushes $r'$ and $s'$ to the entering and leaving terminals of the field winding, a circuit controller for shunting more or less of the field in the path of the current flowing between brushes $r$ and $s$, and a device responding to changes in the main or generated current automatically controlling the circuit controller so as to preserve the effective voltage of the machine such as will maintain a constant current in the main circuit under varying loads.

In witness whereof I have hereunto set my hand this 27th day of December, 1892.

WILLIAM H. ELKINS.

Witnesses:
N. F. HAYES,
A. McCLURE.